United States Patent
Kee et al.

(10) Patent No.: US 10,140,681 B2
(45) Date of Patent: Nov. 27, 2018

(54) CACHING METHOD OF GRAPHIC PROCESSING UNIT

(71) Applicants: Changseo Kee, Goyang-si (KR); Youngju Heo, Seoul (KR); Sungjin Lee, Gwangmyeong-si (KR)

(72) Inventors: Changseo Kee, Goyang-si (KR); Youngju Heo, Seoul (KR); Sungjin Lee, Gwangmyeong-si (KR)

(73) Assignee: INNODEP CO., LTD., Seoul (KR)

( * ) Notice: Subject to any disclaimer, the term of this patent is extended or adjusted under 35 U.S.C. 154(b) by 141 days.

(21) Appl. No.: 15/457,649

(22) Filed: Mar. 13, 2017

(65) Prior Publication Data
US 2017/0270632 A1    Sep. 21, 2017

(30) Foreign Application Priority Data
Mar. 15, 2016 (KR) .......... 10-2016-0030951

(51) Int. Cl.
*G06T 1/20* (2006.01)
*G06T 1/60* (2006.01)

(52) U.S. Cl.
CPC . *G06T 1/60* (2013.01); *G06T 1/20* (2013.01)

(58) Field of Classification Search
CPC .................................... G06T 1/20; G06T 1/60
USPC ........ 345/530, 536, 537, 538, 541, 542, 557
See application file for complete search history.

(56) References Cited

U.S. PATENT DOCUMENTS

| | | | | |
|---|---|---|---|---|
| 8,327,071 B1 * | 12/2012 | Danskin | .............. | G06F 12/0815 345/557 |
| 8,368,710 B1 * | 2/2013 | Tischler | .............. | G06F 12/0862 345/557 |

FOREIGN PATENT DOCUMENTS

KR        10-1699029 B        1/2017

OTHER PUBLICATIONS

Yong Cao, GPU Memory, Referencing UIUC ECE498AL Course Notes, 2009.
Buck, GPU computing with NVIDIA CUDA. In SIGGRAPH Courses, Aug. 2007.

* cited by examiner

*Primary Examiner* — Jacinta M Crawford
(74) *Attorney, Agent, or Firm* — John K. Park; Park Law Firm (57) ABSTRACT

The present invention relates to a caching method of multi-core graphic processing unit (GPU) for improving image processing performance by efficiently storing video data into the cache memory out of the global memory. One aspect of the present invention is to provide a caching method of graphic processing unit (GPU) having multiple cores wherein at least a part of pixels out of A*B pixels of video data are cached into a cache memory in order to perform image processing on k pixels of N*N size (where, k, N, A and B are natural numbers; k=N*N; A>N; B>N), the method comprising: grouping the at least a part of pixels out of A*B pixels into k pixel groups; mapping the k pixel groups to k cores of the GPU one-to-one basis by utilizing index information of each of the k pixels; and storing video data of the k pixel groups in the cache memory with reference to the mapping result.

10 Claims, 10 Drawing Sheets

cimg[cache_offset + 0 * cache_pitch] = org[org_offset + 0 * org_pitch];
cimg[cache_offset + 1 * cache_pitch] = org[org_offset + 1 * org_pitch];
cimg[cache_offset + 2 * cache_pitch] = org[org_offset + 2 * org_pitch];

(b)

FIG. 8 cimg[cache_offset + 0 * cache_pitch] = org[org_offset + 0 * org_pitch];
cimg[cache_offset + 1 * cache_pitch] = org[org_offset + 1 * org_pitch];
cimg[cache_offset + 2 * cache_pitch] = org[org_offset + 2 * org_pitch];

FIG. 9 org_pitch = (width & ~ hor_mask) | (1 & hor_mask);
cache_pitch = (6 & ~ hor_mask) | (1 & hor_mask);
org_offset = ((t0 + width − 1) & ~ hor_mask) | (((t1>>1) * width + (t1&1) * 3 − width − 1) & hor_mask);
cache_offset = ((t0 + 6 − 1) & ~ hor_mask) | (((t1>>1) * 6 + (t1 & 1) * 3 − 6 − 1) & hor_mask);
cimg[cache_offset + 0 * cache_pitch] = org[org_offset + 0 * org_pitch];
cimg[cache_offset + 1 * cache_pitch] = org[org_offset + 1 * org_pitch];
cimg[cache_offset + 2 * cache_pitch] = org[org_offset + 2 * org_pitch];

CACHING METHOD OF GRAPHIC PROCESSING UNIT

BACKGROUND OF THE INVENTION

The present invention relates to a caching method of graphic processing unit (GPU) for improving image processing performance.

The GPU has multiple cores which are arranged in grid structure. The multiple cores parallely process data which results in high performance in image processing. Further, GPU may provide fast processing for ordinary data, and this kind of GPU may be called as a general purpose GPU (GPGPU).

The GPU may process video data by unit of area block. The mask operation is an example in which GPU uses a mask matrix. The mask operation is based on the convolution technique. In the convolution technique, the mask operation, the base unit of area block processing, is applied to the entire image with moving the position.

The GPU may read video data from an internal or external memory, e.g., a global memory, for image processing. The read speed of the global memory is rather slow, which lowers its image processing performance. Moreover, the GPU duplicates read operations of video data out of the global memory, because the multiple cores of the GPU individually access the global memory. This inefficiency in memory access further lowers image processing performance of the GPU.

SUMMARY OF THE INVENTION

It is, therefore, an object of the present invention to provide a caching method of graphic processing unit which may improve image processing speed by efficiently storing video data into the cache memory out of the global memory.

One aspect of the present invention is to provide a caching method of graphic processing unit (GPU) having multiple cores wherein at least a part of pixels out of A*B pixels of video data are cached into a cache memory in order to perform image processing on k pixels of N*N size (where, k, N, A and B are natural numbers; k=N*N; A>N; B>N), the method comprising: grouping the at least a part of pixels out of A*B pixels into k pixel groups; mapping the k pixel groups to k cores of the GPU one-to-one basis by utilizing index information of each of the k pixels; and storing video data of the k pixel groups in the cache memory with reference to the mapping result, wherein the at least a part of pixels out of A*B pixels are grouped into the k pixel groups without any duplication, wherein the k pixel groups includes a plurality of horizontal pixel groups and a plurality of vertical pixel groups, and wherein each of the k cores chooses either the horizontal pixel groups or the vertical pixel groups by a first calculation using the index information of a pixel on which the image processing is to be performed.

Another aspect of the present invention is to provide a caching method of graphic processing unit (GPU) having multiple cores wherein at least a part of pixels out of A*B pixels of video data are cached into a cache memory in order to perform image processing on pixels of a predetermined size (where, A and B are natural numbers), the method comprising: grouping the at least a part of pixels out of A*B pixels into a plurality of horizontal pixel groups and a plurality of vertical pixel groups; for each of the multiple cores, choosing either the horizontal pixel groups or the vertical pixel groups by a first calculation using index information of a pixel on which the image processing is to be performed; for each of the multiple cores, selecting a pixel group out of the above-chosen pixel groups by a second calculation using the index information; and for each of the multiple cores, storing video data of the selected pixel group into the cache memory.

The caching method of graphic processing unit according to the present invention may have an advantage that the image processing speed may be improved by reducing the duplicated reads of video data out of global memory.

DESCRIPTION OF SPECIFIC EMBODIMENTS

Exemplary embodiments of the invention will be described below in more detail with reference to theccompanying drawings.

Figure 1:
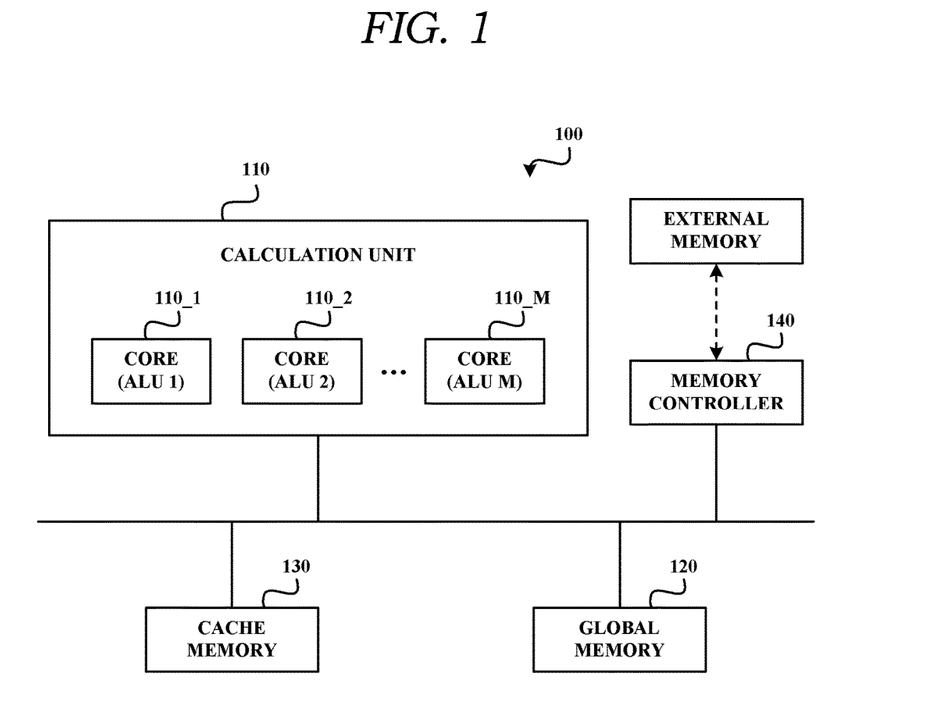
FIG. 1 is a block diagram of a graphic processing unit according to an embodiment of the invention.

FIG. 1 is a block diagram of a graphic processing unit according to an embodiment of the invention. Graphic processing unit (GPU) is disclosed in this specification as one example of image processing apparatus, which does not limit the scope of the present invention. Various kinds of data processing unit, e.g., central processing unit (CPU), may be acceptable in the present invention.

Referring to FIG. 1, GPU 100 comprises a calculation unit 110, a global memory 120, a cache memory 130, and a memory controller 140. The calculation unit 110 comprises multiple cores 110_1~110_M so as to perform parallel processing using the multiple cores. Preferably, each core 110_1~110_M may be implemented as Arithmetic Logic Unit (ALU).

The plurality of cores 110_1~110_M may share the global memory 120 and the cache memory 130. For example, each of the cores 110_1~110_M may do cache operation between the global memory 120 and the cache memory 130, i.e., may read video data out of the global memory 120 and then store them into the cache memory 130. The video data of a plurality of pixels which is to be processed by the calculation unit 110 may be stored in the global memory 120, and video data in the global memory 120 may be cached into the cache memory 130.

The memory controller 140 may access an external memory. That is, the memory controller 140 may read data out of the external memory and then store them into the global memory 120. In an embodiment, video data corresponding to at least one frame are stored in the external memory, and a part of data in the external memory may be moved into the global memory 120.

The calculation unit 110 accesses the global memory 120 in order to read video data for image processing. The read speed of the global memory 120 is very slow. In addition, when the image process is based on convolution technique, the cores 110_1~110_M duplicates read operations of video data. For example, when the convolution technique is based on 3*3 area block processing, each pixel of the video data may be read nine (9) times by the calculation unit 110. This duplication shall lower the image processing performance of the GPU.

In the present invention, a caching method is proposed so as to minimize the mount of data to be read out of the global memory 120. As an example, for area block processing of a predetermined size of pixels, video data of more pixels than and including the predetermined size of pixels may be read out of the global memory 120. According to an embodiment, a plurality of pixels which is read out of the global memory 120 may be grouped into multiple groups. The cores 110_1~110_M may manage the caching process for the multiple groups. The number of pixel groups may be more or may be less than the cores 110_1~110_M. Alternatively, the number of pixel groups may be same as the cores 110_1~110_M, in which each core may take charge of cache operation of video data for each pixel group.

Each core 110_1~110_M may execute a caching algorithm in order to cache the video data. As an example, the caching algorithm may be stored in the global memory 120 or in the cache memory 130.

Figure 2:
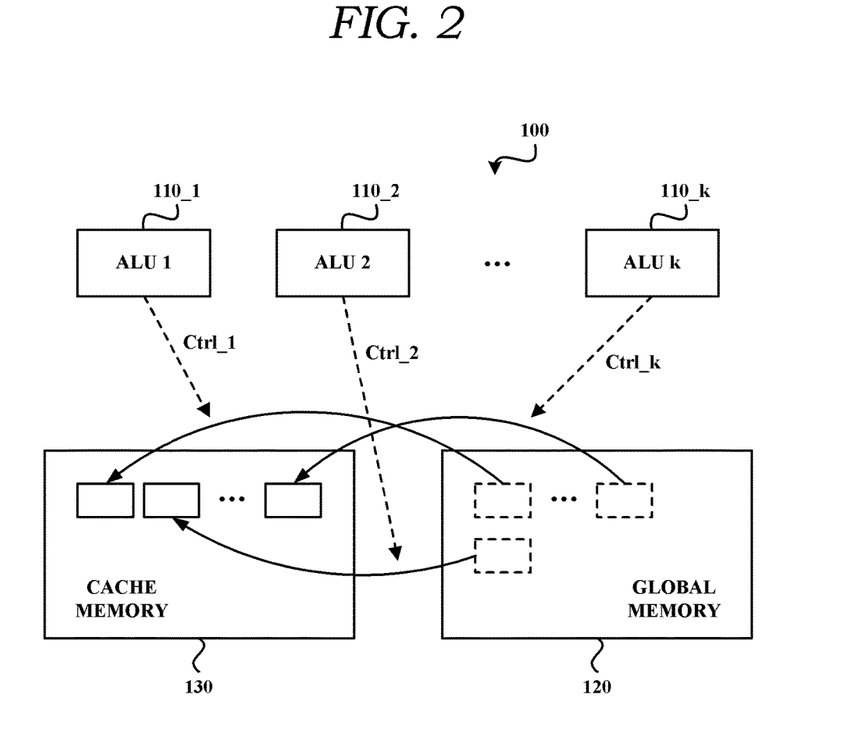
FIG. 2 is a block diagram illustrating an example in which multiple cores individually caches video data.

FIG. 2 is a block diagram illustrating an example in which multiple cores individually caches video data.

Referring FIG. 2, an image processing (e.g., convolution) for a specific region of pixels may be performed by a predetermined unit. As an example, adjacent N*N pixels (i.e., totally k pixels) may be parallely processed by k cores. Further, more than k pixels of video data may be utilized in the image processing on k pixels, in which the pixels of video data may be grouped into a plurality of groups, e.g., k groups.

Each of k cores 110_1~110_k may cache one group of video data into the cache memory 130 out of the global memory 120. By executing a caching algorithm, k cores 110_1~110_k may generate control signals Ctrl_1~Ctrl_k for controlling the move of video data from the global memory 120 into the cache memory 130. For example, by the control signal Ctrl_1 of the 1st core 110_1, one group of pixels of video data in the global memory 120 may be cached into the cache memory 130.

In FIG. 2, it is illustrated that k cores 110_1~110_k may generate the control signals Ctrl_1~Ctrl_k for controlling the caching of video data. Alternatively, in other embodiment, a control unit (not shown) may be equipped with the GPU 100 so as to control reading video data out of the global memory 120 as well as storing the video data into the cache memory 130. In this embodiment, the control unit may generate the control signals Ctrl_1~Ctrl_k under the control of the cores 110_1~110_k.

Figure 3:
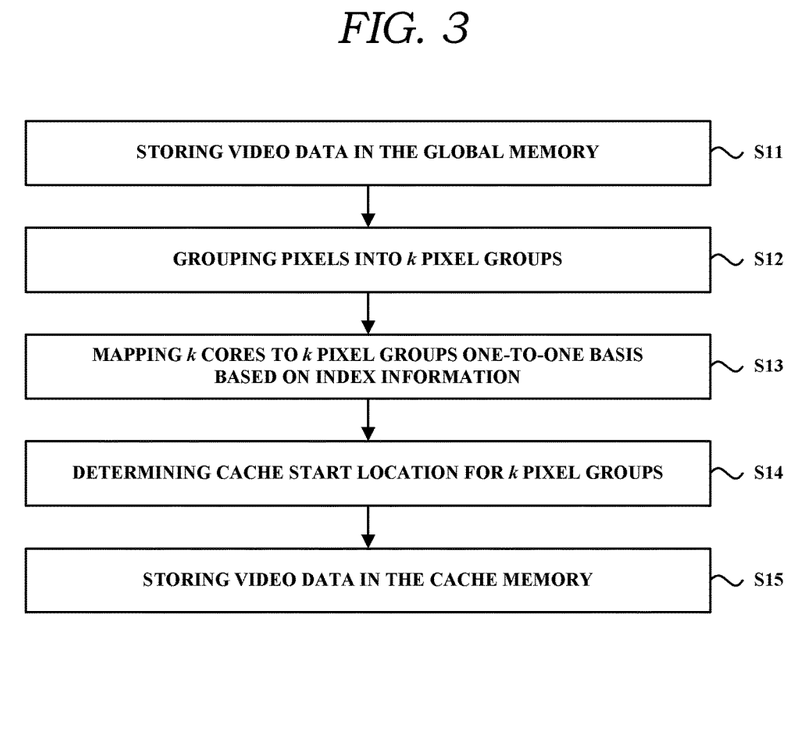
FIGS. 3 and 4 are flowcharts illustrating caching methods of graphic processing unit according to embodiments of the invention.
Figure 4:
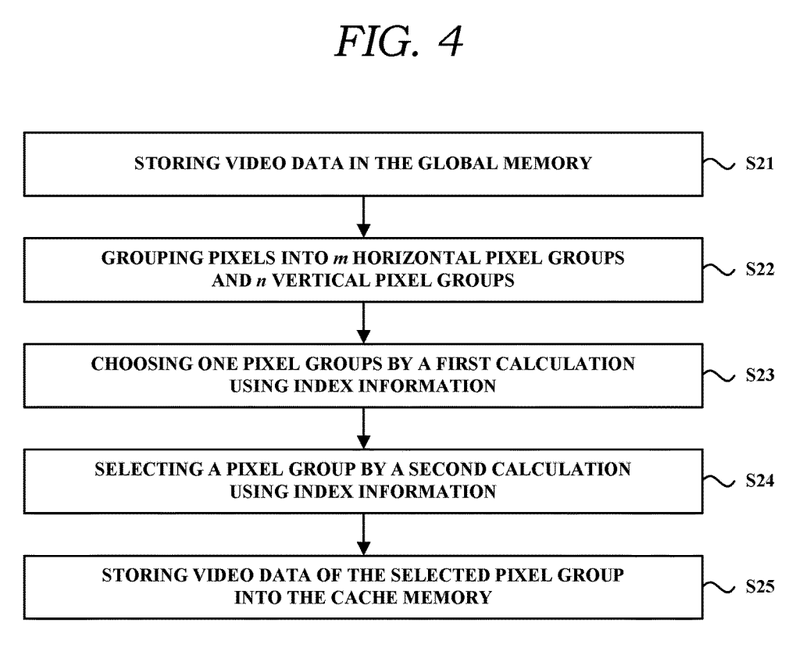

FIGS. 3 and 4 are flowcharts illustrating caching methods of graphic processing unit according to embodiments of the invention.

Firstly, the GPU 100 receives video data. For example, the GPU 100 may receive pixels of video data by unit of one frame. Alternatively, the GPU 100 may receive pixels of video data by different units, respectively. Each unit of pixels may include a plurality of rows and columns of pixels.

Each pixel may include multiple bits of video data. In an example, each pixel may include 1 byte (i.e., 8 bits) of video data. In another example, each pixel may include multiple bits of video data, in which the image processing may be performed on partial bits. For example, each pixel may include 16 bits of video data, in which the image processing may be performed on 8 bits of luminance information. The video data received in the GPU 100 may be stored in an internal storage, e.g. in the global memory 120 (S11).

When it assumes that image processing is based on convolution technique using a mask matrix on the pixels of a specific unit (e.g., area), the image processing may utilize adjacent pixels of video data as well as the pixels of the specific unit.

Figure 5:
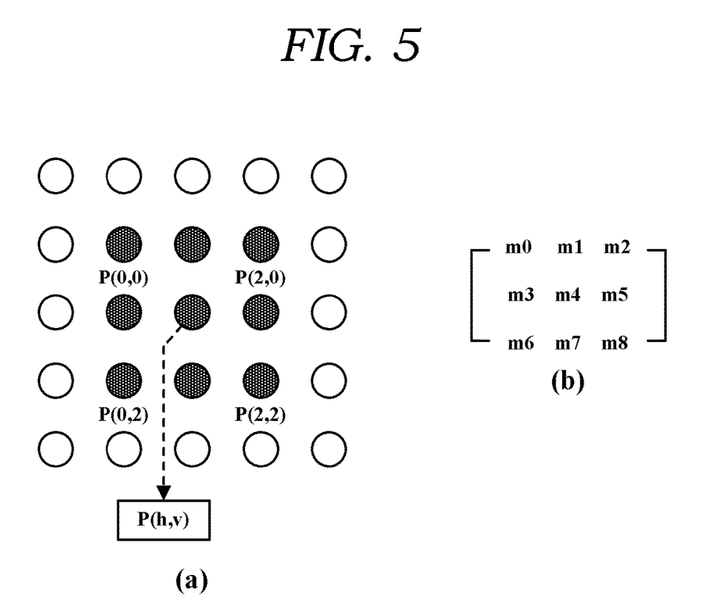
FIG. 5 illustrates an example of pixels and a mask matrix for image processing.

FIG. 5 illustrates an example of pixels and a mask matrix for an image processing, when tha image processing is performed by a unit of 3*3 pixels. In the following description, FIGS. 5 (*a*) and (*b*) shall be further referenced.

In order to perform image processing on 3*3 pixels, the 3*3 pixels of video data as well as its adjacent pixels are need. For example, at least twenty-five (25) pixels of video data (i.e., 5*5 pixels) are need for the image processing. In order to improve speed of the image processing, at least twenty-five (25) pixels of video data (i.e. 5*5 pixels) shall be moved into the cache memory 130 out of the global memory 120.

Index information may be defined for each pixel of the 3*3 pixels of the image processing object. For example, as shown in FIG. 5 (*a*), horizontal index (h) of 0 as well as vertical index (v) of 0 may be defined for the 1st pixel in row 1 and column 1 of the 3*3 pixels. Further, horizontal index (h) of 2 as well as vertical index (v) of 0 may be defined for the 3rd pixel in row 1 and column 3 of the 3*3 pixels. Furthermore, horizontal index (h) of 2 as well as vertical index (v) of 2 may be defined for the 9th pixel in row 3 and column 3 of the 3*3 pixels.

When the mask matrix is size of 3*3, twenty-five (25) pixels of video data (5*5 pixels) may be needed in order to perform image processing on 3*3 pixels. For example, the image processing on the P(0, 0) may include arithmetic calculations using coefficients of the mask matrix (m0~m8) and 3*3 pixels which centering the P(0, 0).

As described above, when video data are stored in the global memory 120, a plurality of pixels of the video data may be moved to the cache memory 130 out of the global memory 120. According to an embodiment of the invention, in order to reduce the duplicated reads of video data out of the global memory 120, the plurality of pixels which are utilized in the image processing may be grouped into at least one groups, e.g., k pixel groups (S12). The plurality of pixels may be grouped into the k groups without duplication. The multiple cores of the calculation unit 110 may provide parallel processing. According to an embodiment of the invention, the number of pixel groups (i.e. k) may correspond to the number of the cores.

Each core may take charge of cache operation of each pixel group. Preferably, each core may identify index information of the pixels which it performs the image processing. Further, based on the index information of the plurality of pixels on which the image processing is performed, k cores may be mapped to k pixel groups in one-to-one basis (S13). That is, each of the k cores performs a predetermined calculation using the index information, and then determines each of the k pixel groups with reference to result of the calculation in order to take charge of the cache operation.

If an image processing on 3*3 pixels (i.e., 9 pixels) is performed with convolution of 3*3 mask matrix, it is needed to cache at least twenty-five (25) pixels of video data including the nine (9) pixels to process. Further, if the image processing on 3*3 pixels is performed by nine (9) cores, each of the cores may only to cache the same number of pixels, e.g., three (3) pixels. When each core takes charge of cache operation of one pixel group with each pixel group including three (3) pixels, twenty-seven (27) pixels of video data may be cached by the nine (9) cores.

As the mapping is completed, in order to store video data of the k pixel groups in the cache memory 130, a cache start location for each pixel group is determined (S14). For example, each core may read a plurality of pixels of a pixel group which is mapped to the core. In an embodiment, a pixel of a pixel group may be determined as the cache start location. The plurality of pixels of video data are sequently read beginning with the cache start location, and then stored in the cache memory 130 (S15).

Figure 6:
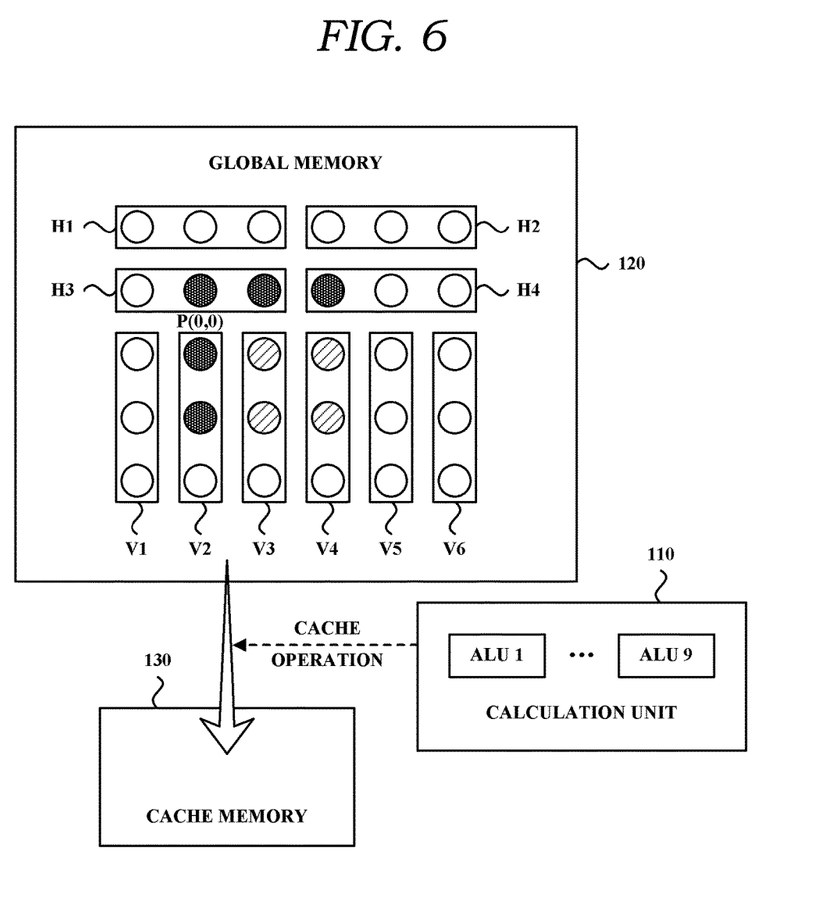
FIG. 6 illustrates an example of grouping pixels for image processing.

FIG. 4 illustrates the caching method of a preferred embodiment of the invention in more detail. FIG. 6 illustrates an example of grouping pixels for image processing, which shall be referenced in describing the flowchart in FIG. 4. Referring to FIG. 6, nine (9) cores ALU1~ALU9 performs an image processing on 3*3 pixels (i.e., 9 pixels). Because each of the cores takes charge of caching three (3) pixels, twenty-seven (27) pixels of video data are cached.

In order to perform an image processing on 3*3 pixels, at least one pixel adjacent thereto may be further utilized in the image processing. FIG. 6 illustrates an example in which at least some of 6*5 pixels including the 3*3 pixels which are stored in the global memory 120 are utilized in the image processing. For the caching purpose, at least some of 6*5 pixels may be grouped into a plurality of pixel groups.

Firstly, the GPU 100 may receive a plurality of pixels of video data for an image processing, and then store them in the global memory 120 (S21). Then, a plurality of pixels which are utiltized in an image processing on pixels of a predetermined size (e.g., 3*3 pixels) may be grouped into a plurality of pixel groups, e.g., m horizontal pixel groups and n vertical pixel groups (S22). The number m and n are appropriately configured so that the sum of m and n equals the number of cores which are participating in this image processing. In case where at least 5*5 pixels (i.e., 25 pixels) of video data shall be read for the image processing on 3*3 pixels, each of nine (9) cores may take charge of caching three (3) pixels, respectively. Then, twenty-seven (27) pixels of video data may be read including twenty-five (25) pixels which are actually utilized in the image processing.

As described above, a plurality of pixels may be grouped into at least one horizontal pixel groups as well as at least one vertical pixel groups. FIG. 6 illustrates an example in which the pixels are grouped into four (4) horizontal pixel groups H1~H4 and five (5) vertical pixel groups (V1~V5). The grouping policy may be widely adoped without being limited to FIG. 6.

The video data may be cached by unit of the pixel group. Preferably, each core may cache one pixel group of video data.

Each core may determine the index information of pixels on which the image processing is to perform. Further, by a first calculation using the index information, each core may choose the direction of cache operation. That is, each of may choose one pixel groups, i.e., either horizontal pixel groups or vertical pixel groups for the cache operation with reference to the first calculation using the index information (S23). For example, one core may choose horizontal pixel groups when the first calculation outputs a predetermined first value, whereas other core may choose vertical pixel groups when the first calculation outputs a predetermined second value.

In each core, the first calculation may output the first or the second value based on index information of pixels on which the image processing is to perform. As an example of the first calculation, each core may perform multiplication operation for horizontal index (h) and vertical index (v). For example, the vertical pixel groups may be chosen when the multiplication of horizontal index (h) and vertical index (v) outputs zero, whereas the horizontal pixel groups may be chosen when the multiplication of horizontal index (h) and vertical index (v) outputs non-zero.

For example, ALU1 performs image processing on P(0, 0) whose indexes are both 0. Because the first calculation for P(0, 0) outputs zero, ALU1 may perform cache operation on vertical pixel groups. Similarly, because the first calculation for each of P(1,0), P(2,0), P(0,2) and P(0,2) outputs zero, the corresponding cores ALU2, ALU3, ALU4 and ALU7 may perform cache operation on vertical pixel groups. On the other hand, the other cores ALU5, ALU6, ALU8 and ALU9 may perform cache operation on horizontal pixel groups because their first calculation outputs non-zero.

In order that each core takes charge of cache operation of one pixel group, each core may select one pixel group by a second calculation using the index information (S24). For example, if ALU1 chooses the vertical pixel groups, the ALU1 may select any one among five (5) vertical pixel groups V1~V5 by a second calculation using the index information. Similarly, if ALU5 chooses the horizontal pixel groups, the ALU5 may select any one among four (4) horizontal pixel groups H1~H4 by the second calculation using the index information.

In this way, each core selects any one out of horizontal or vertical pixel groups based on output of the second calculation. Then, the pixels of video data in the selected pixel group are stored in the cache memory 130 (S25).

The detailed examples of the cache operation of the vertical pixel groups or the horizontal pixel groups are specifically described below.

Figure 7:
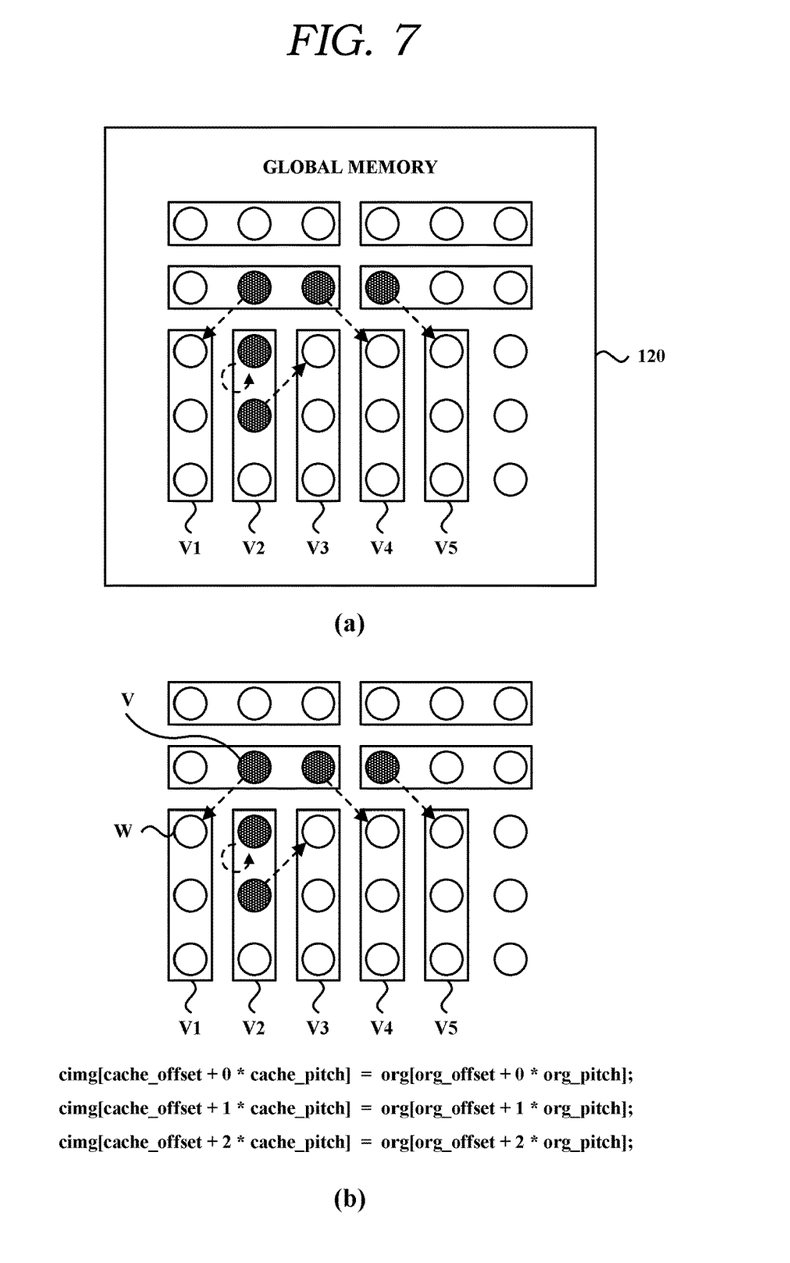
FIG. 7 illustrates an example of performing cache operation of the vertical pixel groups according to the present invention.

FIG. 7 illustrates an example of performing cache operation of the vertical pixel groups according to the present invention.

As described above, by the first calculation of horizontal or vertical indexes (h, v), the cores ALU1, ALU2, ALU3, ALU4 and ALU7 may perform cache operation of vertical pixel groups, respectively. That is, each of the cores ALU1, ALU2, ALU3, ALU4 and ALU7 may perform cache operation of each of the vertical pixel groups V1~V5.

In order to select a pixel group out of V1~V5, each core may perform calculation of Equations 1 and 2 as below.

$$t0 = h*3 + v \quad \text{(Eq. 1)}$$

$$t0 = t0 - ((t0 >> 2) << 1) \quad \text{(Eq. 2)}$$

By the Equations 1 and 2, each core produces t0 value using the index information of the pixels on which the image processing is to be performed. For example, by the Equation 1, ALU1, ALU2, ALU3, ALU4 and ALU7 shall produce t0 values of 0, 3, 6, 1 and 2, respectively.

Referring to Equation 2, one-bit shift left operation as well as two-bit shift right operation are sucessively performed to the t0 value. Further, it is calculated the difference value between the output of Equation 1 and the output of the shift operations. By the Equation 2, ALU1, ALU2, ALU3, ALU4 and ALU7 shall produce 0, 3, 4, 1 and 2, respectively.

Then, Equations 3 and 4 shall be performed using the output of Equations 1 and 2, by which each of the cores shall be mapped to each of the vertical pixel groups. For example, position of a pixel in which each core starts the cache operation by Equations 3 and 4 of below, by which each of the vertical pixel groups is selected for each of the cores for the cache operation.

In order to identify cache start location where read operation starts for caching, each core may perform Equations 3 as below.

$$\text{org\_offset} = t0 + \text{width} - 1 \qquad \text{(Eq. 3)}$$

In this specification, 'width' represents the line width of pixel block. In the example shown in FIG. 7, the value of 'width' is 6.

By the Equation 3, the start locations (org_offset) of the cache operation may be produced. Referring to FIG. 7 (b), when assuming that the pixel P(0, 0) in location V is a reference pixel of the video data in the image processing, the value of 'width−1' in the Equation 3 may correspond to the pixel in location W which is located in the next line (i.e., next row) and one-pixel shift left from the reference pixel.

Referring that the t0 values are 0, 3, 4, 1 and 2 by the Equation 2, the cache start locations of ALU1 and ALU2 are the top pixels of the first vertical pixel group V1 and the fourth vertical pixel group V4, respectively. Similarly, the cache start locations of the other cores shall be the top pixels of corresponding vertical pixel groups.

Further, Equation 4 provides a pitch value of the read operation, i.e., the number of pixels by which the reading advances in successive reading.

$$\text{org\_pitch} = \text{width} \qquad \text{(Eq. 4)}$$

Because the pitch value (org_pitch) is the line width of the pixel block, pixels are sequently read to the downward direction in each vertical pixel group. Furthermore, an example of algorithm of the above-described cache operation of the vertical pixel groups is shown in FIG. 7 (b).

Therefore, in the above-described example, ALU1, ALU2, ALU3, ALU4 and ALU7 shall perform cache operation of the vertical pixel groups V1, V4, V5, V2 and V3, respectively.

Figure 8:
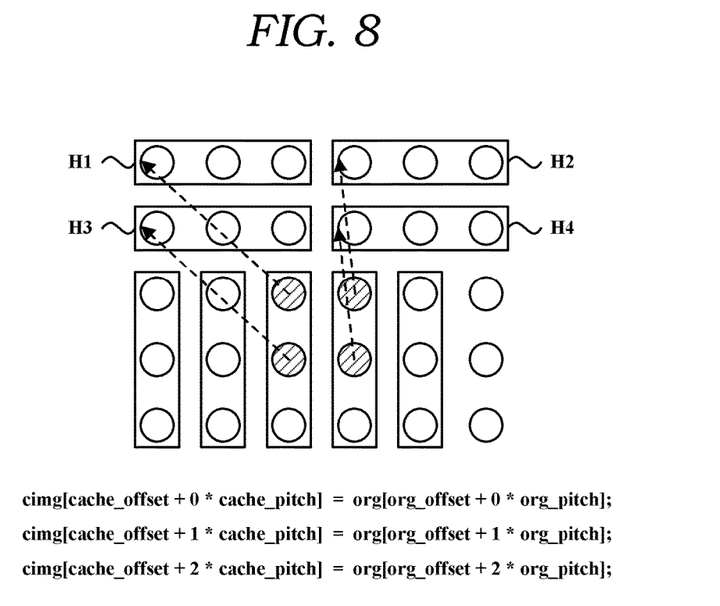
FIG. 8 illustrates an example of performing cache operation of the horizontal pixel groups according to the present invention.

FIG. 8 illustrates an example of performing cache operation of the horizontal pixel groups according to the present invention.

In the above-described embodiment, by the first calculation using the horizontal and vertical indexes (h, v), the cores ALU5, ALU6, ALU8 and ALU9 shall perform cache operation of horizontal pixel groups. For example, each of the cores ALU5, ALU6, ALU8 and ALU9 may perform cache operation of each of the horizontal pixel groups H1~H4.

In order to select any one of the horizontal pixel groups H1~H4, each of the cores may perform the Equation 5 as below.

$$t1 = (h + v*2) - 3 \qquad \text{(Eq. 5)}$$

For example, ALU5 which performs image processing for the pixel P(1, 1) produces t1 value of 0 by the Equation 5 because the indexes (h, v) of the pixel P(1, 1) are both 1. Similarly, ALU6, ALU8 and ALU9 produce t1 values of 1, 2 and 3 by the Equation 5, respectively.

Then, Equations 6 and 7 shall be calculated based on the above-described calculation results, by which each of the cores shall be mapped to each of the horizontal pixel groups. Preferably, the Equations 6 and 7 may produce pixel positions where each of the cores starts cache operation, by which each of the cores may identify its corresponding horizontal pixel group for cache operation.

In order to identify cache start location where read operation starts for caching, each core may perform Equations 6 as below.

$$\text{org\_offset} = ((t1 >> 1)*\text{width} + (t1*1)*3 - \text{width} - 1 \qquad \text{(Eq. 6)}$$

By the Equation 6, the start locations (org_offset) of the cache operation may be produced. Referring to FIG. 8, due to '(t1>>1)*width' part in the Equation 6, ALU5 and ALU6 which having t1 values less than 1 shall take charge of cache operations for the first line of horizontal pixel groups H1, H2, whereas ALU8 and ALU9 which having t1 values greater than 2 shall take charge of cache operations for the second line of horizontal pixel groups H3, H4.

Similarly, due to '(t1&1)*3−width−1' part in the Equation 6, ALU5 and ALU8 which having even t1 values shall take charge of cache operations for the left line of horizontal pixel groups H1, H3, whereas ALU6 and ALU9 which having odd t1 values shall take charge of cache operations for the right line of horizontal pixel groups H2, H4.

In summary, by the Equation 6, the cache start locations for ALU5, ALU6, ALU8 and ALU9 shall be the leftmost pixels in the horizontal pixel groups H1, H2, H3 and H4, respectively.

Further, Equation 7 provides a pitch value of the read operation, i.e., the number of pixels by which the reading advances in successive reading.

$$\text{org\_pitch} = 1 \qquad \text{(Eq. 7)}$$

Because the pitch value (org_pitch) is 1, pixels are sequently read to the rightward direction in each horizontal pixel group. Furthermore, an example of algorithm of the cache operation of the horizontal pixel groups is shown in FIG. 8. That is, ALU5, ALU6, ALU8 and ALU9 shall perform cache operation of the horizontal pixel groups H1, H2, H3 and H4, respectively.

Figure 9:
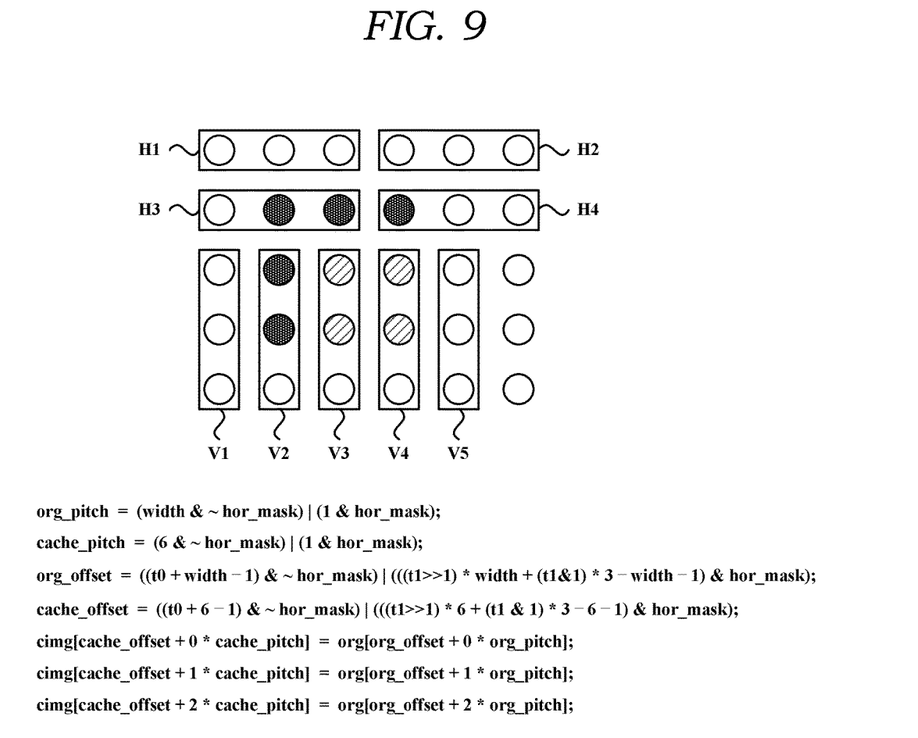
FIG. 9 illustrates an example of integrally performing cache operation of the vertical and horizontal pixel groups according to the present invention.

FIG. 9 illustrates an example of integrally performing cache operation of the vertical and horizontal pixel groups according to the present invention.

In performing the cache operation, it is preferable that the cores never branch off regardless of the outputs of calculations. For example, when first cores are mapped to the vertical pixel groups by the first calculation and second cores are mapped to the horizontal pixel groups by the first calculation, both kind of cores may perform cache operation by the same algorithm shown in FIG. 9. That is, the first cores and the second cores do not have to branch off for performing different procedures.

In an embodiment, each core may determine either vertical pixel groups or horizontal pixel groups for cache operation by the Equation 8 as below.

$$\text{hor\_mask} = ((h*v) + 0x7fffffff) >> 31 \qquad \text{(Eq. 8)}$$

The Equation 8 produces a 32-bit value (hor_mask). Preferably, each core may produce the hor_mask by using index information of pixels on which the image processing is being performed. When the multiplication of indexes (h, v) is zero (0), the hor_mask has all zero bits. In the other hand, when the multiplication of indexes (h, v) is non-zero, the hor_mask has all 1 bits.

As the hor_mask is produced as described above, cache operation may be performed by the algorithm shown in FIG. 9. For example, each core may produce the cache start location (org_offset) by using the hor_mask value. If hor_mask is all zero bits, the cache start location shall be the top pixel of a vertical pixel group. In the other hand, if hor_mask is all 1 bits, the cache start location shall be the leftmost pixel of a horizontal pixel group.

The cores which perform cache operation of the vertical pixel groups may read pixels sequently from the cache start location downward, and the cores which perform cache operation of the horizontal pixel groups may read pixels sequently from the cache start location rightward.

The algorithm of cache operation shown in FIG. 9 is an example. According to the present invention, other algorithms may be variously adopted so as to accomplish the same or similar function.

Figure 10:
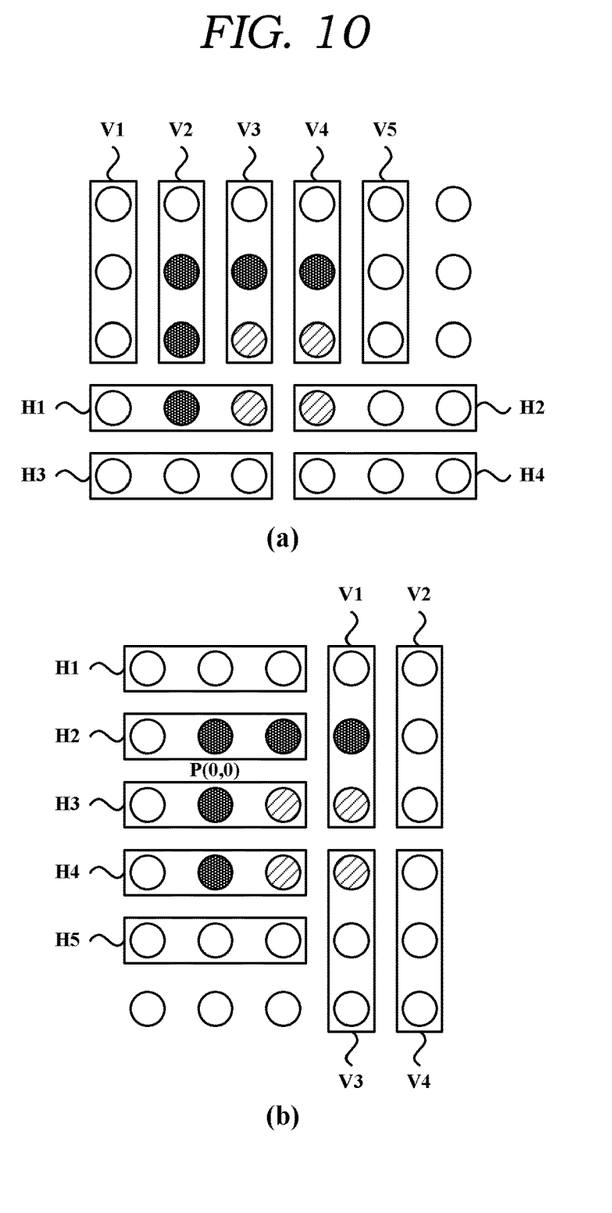
FIG. 10 illustrates examples of grouping pixels in the present invention.

FIG. 10 illustrates examples of grouping pixels in the present invention, in which nine (9) pixels including P(0, 0) to P(2, 2) are to be image processed.

Referring to FIG. 10 (a), in order to perform cache operation of the 6*5 pixel block in which the nine (9) pixels and their adjacent pixels are included, pixel groups are defined for at least a part of the 6*5 pixel block. The upper 5*3 pixels may be defined as five (5) vertical pixel groups V1~V5. Further, lower 6*2 pixels may be defined as four (4) horizontal pixel groups H1~H4.

Referring to FIG. 10 (b), in order to perform cache operation of the 5*6 pixel block in which the nine (9) pixels and their adjacent pixels are included, pixel groups are defined for at least a part of the 5*6 pixel block.

In this case, the numbers of vertical pixel groups and horizontal pixel groups may be differently chosen from the former case. For example, the 3*5 pixels in leftside may be defined as five (5) horizontal pixel groups H1~H5. Further, 2*6 pixels in rightside may be defined as four (4) vertical pixel groups V1~V4. Each core may perform cache operation of each pixel group, in which the mapping is configured based on the calculations as described above using index information of corresponding pixels.

The invention can also be embodied as computer readable codes on a computer readable non-volatile recording medium. The computer readable non-volatile recording medium is any data storage device that can store data which may be thereafter read by a computer system. Examples of the computer readable non-volatile recording medium include read-only memory (ROM), random-access memory (RAM), CD-ROMs, magnetic tapes, floppy disks, and optical data storage devices. The computer readable non-volatile recording medium can also be distributed over network coupled computer systems so that the computer readable code is stored and executed in a distributed fashion.

What is claimed is:

1. A caching method of graphic processing unit (GPU) having multiple cores wherein at least a part of pixels out of A*B pixels of video data are cached into a cache memory in order to perform image processing on k pixels of N*N size (where, k, N, A and B are natural numbers; k=N*N; A>N; B>N), the method comprising:
    grouping the at least a part of pixels out of A*B pixels into k pixel groups;
    mapping the k pixel groups to k cores of the GPU one-to-one basis by utilizing index information of each of the k pixels; and
    storing video data of the k pixel groups in the cache memory with reference to the mapping result,
    wherein the at least a part of pixels out of A*B pixels are grouped into the k pixel groups without any duplication,
    wherein the k pixel groups includes a plurality of horizontal pixel groups and a plurality of vertical pixel groups, and
    wherein each of the k cores chooses either the horizontal pixel groups or the vertical pixel groups by a first calculation using the index information of a pixel on which the image processing is to be performed.

2. The method according to the claim 1, wherein the A*B pixels includes the k pixels of N*N size.

3. The method according to the claim 2, wherein each of the k pixel groups includes N consecutive pixels, wherein the k cores performs the image processing on the k pixels of N*N size, and wherein the k cores store k*N pixels of video data into the cache memory.

4. The method according to the claim 2, wherein the k pixel groups includes m horizontal pixel groups and n vertical pixel groups, wherein each of the m horizontal pixel groups includes N horizontally-consecutive pixels, and wherein each of the n vertical pixel groups includes N vertically-consecutive pixels (where, m and n are natural numbers; m+n=k).

5. The method according to the claim 4, wherein each of the k cores chooses either the horizontal pixel groups or the vertical pixel groups for the cache operation by a first calculation using the index information.

6. The method according to the claim 5, wherein each of the k cores either selects a pixel group out of the m horizontal pixel groups or selects a pixel group out of the n vertical pixel groups by a second calculation using the index information.

7. The method according to the claim 1, wherein each of the k cores either selects a pixel group out of the plurality of horizontal pixel groups or selects a pixel group out of the plurality of vertical pixel groups by a second calculation using the index information.

8. A caching method of graphic processing unit (GPU) having multiple cores wherein at least a part of pixels out of A*B pixels of video data are cached into a cache memory in order to perform image processing on pixels of a predetermined size (where, A and B are natural numbers), the method comprising:
    grouping the at least a part of pixels out of A*B pixels into a plurality of horizontal pixel groups and a plurality of vertical pixel groups;
    for each of the multiple cores, choosing either the horizontal pixel groups or the vertical pixel groups by a first calculation using index information of a pixel on which the image processing is to be performed;
    for each of the multiple cores, selecting a pixel group out of the above-chosen pixel groups by a second calculation using the index information; and
    for each of the multiple cores, storing video data of the selected pixel group into the cache memory.

9. The method according to the claim 8, wherein at least a part of pixels out of A*B pixels of video data are cached into the cache memory in order to perform image processing on k pixels of N*N size (where, k and N are natural numbers; k=N*N; N<A; N<B), wherein the plurality of horizontal pixel groups and the plurality of vertical pixel groups includes the k pixel groups together, and wherein each pixel group includes N consecutive pixels in each direction.

10. The method according to the claim 9, wherein the image processing on the k pixels is performed by parallel processing by k cores of the multiple cores, and wherein each of the k cores stores video data of each of the pixel groups into the cache memory.

* * * * *